April 23, 1929.　　　O. JOHNSON　　　1,710,025
BRAKE BAND CONTROLLING DEVICE
Filed Feb. 26, 1926
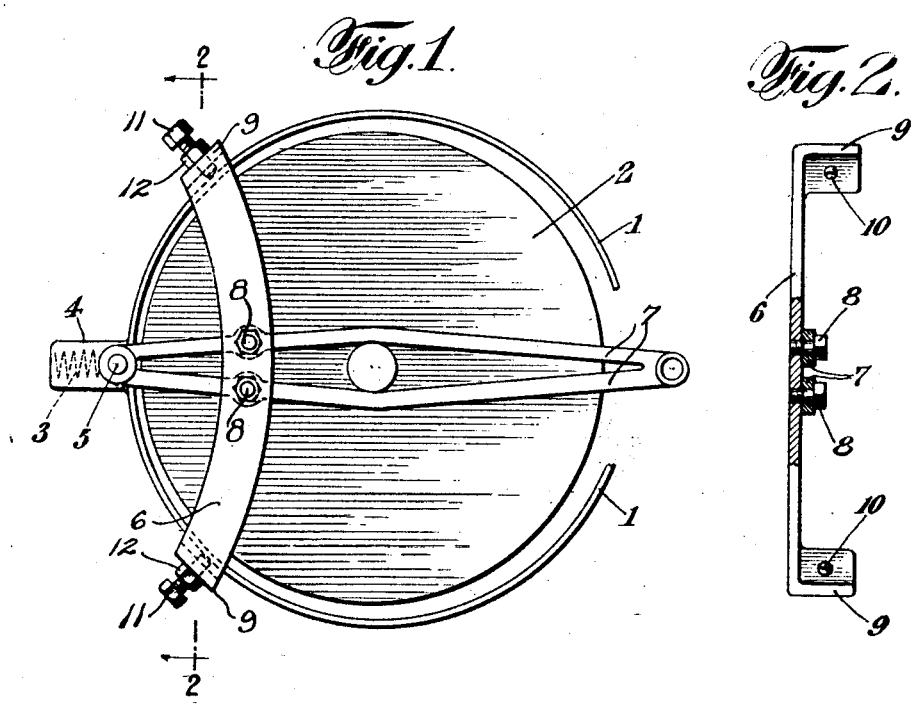
Inventor
Olaf Johnson
By his Attorney Patented Apr. 23, 1929.

1,710,025

UNITED STATES PATENT OFFICE.

OLAF JOHNSON, OF NORTHVILLE, NEW YORK.

BRAKE-BAND-CONTROLLING DEVICE.

Application filed February 26, 1926. Serial No. 90,925.

My invention relates to brake band controlling means and is more especially adapted to providing means whereby the distance of movement of the brake band away from the brake drum is controlled so as to reduce the amount of movement of the brake band necessary to bring it in contact with the brake drum. My device is adapted to be attached to most all of the brakes in use, especially on automobiles.

In the drawing, Figure 1, is a side view of a brake, having my device attached thereto, and Fig. 2 is a view of my device taken on the line 2, 2 of Figure 1 with the brake band and drum omitted. In the drawings 1, 1 is the upper and lower portion of the brake bands which are adapted to be drawn, in any well known manner (not shown), into contact with the brake drum 2. These brake bands are carried on a pin 5 and are arranged, when released from contact with the drum, to be moved away from the drum 2 by a spring 3. At the back or left of the drum as shown in Figure 1, the spring tends to draw the bands much farther away from the drum than is necessary and this requires additional movement, when the brake is being applied, of the brake bands toward the drum. To overcome this I provide a bracket 6 which is bolted as shown to the brake support or bracket 7 by bolts 8, 8. This bracket 6 is provided with flanges 9 extending out over the brake band substantially parallel therewith. These flanges have openings or holes 10 therein which are threaded to receive adjustment screws 11. A lock nut 12 is provided so that when the adjustment screw is in its desired position to engage with the brake bands at the required distance away from the drum it can be locked in that position and held against movement until another adjustment is desired. As will be seen the ends of adjustment screws contact with the brake band and prevent the further movement of the bands away from the drum 2. From time to time as wear on the brake lining requires it the adjustment screws can be turned so as to bring their ends nearer to the brake drum 2, and in that way reduce the distance of movement away from the brake drum 2 of the brake bands 1. My device can, if desired, be manufactured and sold as an accessory, being adapted to be attached to brakes by users or may be manufactured as part of the brake originally.

Claims—

1. In a device for controlling the movement of brake bands, a unitary bracket, means for attaching said bracket adjacent the brake bands, and adjustable means carried at opposite ends of said bracket to engage the brake bands and control the distance of movement of same away from the brake drum, said bracket being situated wholly between the two horizontal planes defining the upper and lowermost portion of the brake bands, and wholly to one side of the vertical plane of the axis of the brake drum.

2. In a band brake having a brake drum with upper and lower brake bands carried by a brake support, the combination of a clearance device comprising a unitary elongated bracket arranged to be attached to the brake support vertically and adjacent the bands, adjustable stop-screws carried at opposite ends of said bracket to engage the upper and lower brake bands, respectively, and controlling the distance of movement of same away from the brake drum, said stop-screws being adapted to be moved toward or away from the brake bands, and means for fixedly locking said stop-screws in adjusted position, said clearance device being situated wholly between the two horizontal planes defining the upper and lowermost portions of the brake bands, and wholly to one side of the vertical plane of the axis of the brake drum.

In testimony whereof, I have signed my name to this specification.

OLAF JOHNSON.